United States Patent [19]

Le Pape

[11] 4,088,650
[45] May 9, 1978

[54] NEW DYES OF THE NAPHTOYLENEBENZIMIDAZOLE SERIES

[75] Inventor: Alain Yves Le Pape, Rouen, France

[73] Assignee: Produits Chimiques Ugine Kuhlmann, Paris, France

[21] Appl. No.: 730,755

[22] Filed: Oct. 7, 1976

[30] Foreign Application Priority Data

Oct. 23, 1975 France .................. 75 32447

[51] Int. Cl.² .............. C07D 471/06; D06P 1/382
[52] U.S. Cl. ........................ 260/282; 8/178 R; 260/42.21
[58] Field of Search ....................... 260/282

[56] References Cited
PUBLICATIONS

Mezhikovskii et al., Chem. Abs. 82, 58338 (1974).
Papenfuhs, Chem. Abs. 84, 32593w, effective date 18 Sep. 1975.

*Primary Examiner*—Donald G. Daus
*Assistant Examiner*—Mark L. Berch
*Attorney, Agent, or Firm*—Beveridge, De Grandi, Kline & Lunsford

[57] ABSTRACT

New dyes useful for coloring polyesters and polyamides and synthesizing structure-colored copolyesters. The dyes can be represented by the formula: t,0010

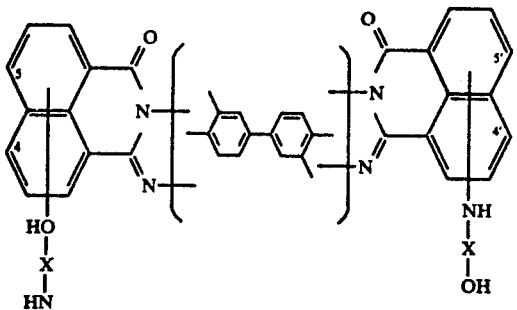

in which X represents a straight or branched chain aliphatic containing 1 to 4 carbon atoms, the NH—X—OH residues being fixed in the 4,4' or 4,5' or 5,5' position.

2 Claims, No Drawings

NEW DYES OF THE NAPHTOYLENEBENZIMIDAZOLE SERIES

The present invention relates to new dyes of the naphtoylenebenzimidazole series. The present invention relates to dyestuffs for the bulk dyeing of polyesters and polyamides, and to dyestuffs which may be used for the synthese of structure-colored copolyesters, i.e. copolyesters characterized in that their macromolecular chains include dye moieties.

Dyestuffs of the invention are represented by the formula:

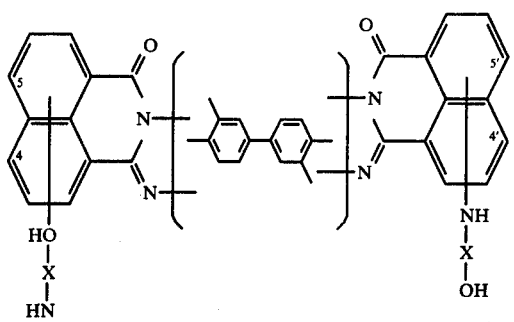

(I)

in which X represents a straight or branched chain aliphatic containing 1 to 4 carbon atoms, the NH-X-OH residues are fixed in the 4,4' or 4,5' or the 5,5' position.

Dyestuffs according to the formula can be prepared by methods known in the prior art. The synthesis of the dyes involves condensation of a mole of 3,4,3',4' tetra-amino diphenyl with at least two moles of halogen substituted in four position naphthalic anhydide. The halogenated derivative obtained from this reaction is treated with an amino-alcohol having the formula H$_2$N—X—OH, wherein X is as defined above.

The dyes of formula (I) can be used for dyeing polyesters and polyamides. The dyeing reaction may be carried out on the polyesters and polyamides in both fiber and plastic form. The dyestuffs in accordance with this invention exhibit excellent thermal stability. Due to the good solubility of the dyes in molten polymers, it is possible to produce very fine fibers with very intense colors, while avoiding the problem encountered during spinning when using pigments. The problems most often encountered during the spinning operation are the blocking of the filters protecting the very fine orifices of the spinning nozzles and frequent breakage of the filaments during drawing operations.

The dyes according to formula (I) are suitable for the syntheses of dyed copolyesters. The macromolecular chain of the copolyester may comprise dyestuff molecules having the formula:

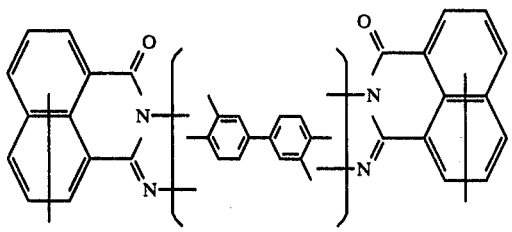

(II)

The colored copolyesters are prepared by copolymerizing one or more of the dyes of formula (I) with the conventional starting materials or constituents of the polyester.

The polyethylene glycol terephthalate is produced by the transeserification of a dimethylterephthalate and ethylene glycol. The reactive mixture is heated in the presence of a catalyst which introduces the bis($\beta$-hydroxyethyl) terephthalate which undergoes polycondensation at high temperature and reduced pressure. Dyed copolyesters are obtained by the esterification of hydroxyl groups in the dyestuffs of formula (I) before completing the synthesis of the polyester.

The quantity of dye of formula (I) used varies directly with colored intensity desired. Very large amounts of dyestuffs according to formula (I) can be used if intense color is desired.

Copolyesters incorporating the dyestuffs of formula (I) and unmodified polyesters exhibit a large reciprocal solubility. The dyed copolyesters especially those having strong coloring intensities are suitable, in commercial use, for the bulk coloration of polyesters or of other polymers (in particular polyamides, polyurethanes and polyolefins), whether in plastics form or in the form of textile fibers.

The colored copolyesters especially those of lower color intensity may be directly transformed into functional fibers for use in the textile industry by methods known in the prior art. Dyed fibers used in accordance with this invention possess all the qualities, i.e., mechanical, plasticity, etc., of fibers classified as polyesters.

The colors obtained by dyes of this invention are lively, transparent, and very resistant to light, washing, migration and rubbing.

The following examples illustrate the embodiments of this invention. All parts and percentages are in weight in the absence of an indication to the contrary. These examples should not in any way be considered as limiting the scope of the invention.

EXAMPLE 1

A reaction vessel containing a reflux column and an agitator is charged with 21.8 parts of 3,4,3',4'-tetra-amino diphenyl, 61 parts of 4-bromo naphthalic anhydride and 500 parts by volume of glacial acetic acid. The mixture is heated and refluxed for four hours. The reaction yields a brick-red precipitate. The precipitate is filtered and washed with boiling water until the pH is neutral. Drying and grinding of the precipitate yields a golden yellow powder.

Twenty parts of this powder are mixed with 200 parts by volume of 2-amino ethanol and heated to about 160°–170° C for four hours. The mixture is then cooled to 50° C and the precipitate is filtered off and washed with boiling ethanol and thereafter dried for five hours at 110° C.

A brick-red powder is obtained with a melting point above 350° C. The dye prepared according to this example dyes polyesters a very reddish-yellow shade.

EXAMPLE 2

One hundred parts of polyethylene glycol terephthalate and 0.5 parts of dye described according to Example 1 are mixed for an hour in a container which rotates about its axis. The mixture is then introduced into a screw extruder where the spinneret of the extruder is heated to about 275° C. At the outlet of the extruder the mixture is cooled and then transformed into grains about two mm long. The grains are dried and then introduced into a spinning device where the molten mixture is subjected to a constant pressure on a melting grid at about 280° C before passing over a filter bed of washed and roasted river sand. The grains of river sand have a diameter of about 0.3 mm. The mixture is passed through a spinning nozzle having seven orifices 0.23 mm in diameter. The filaments obtained are drawn with drawing coefficient of 5 and heat treated at 150° C for 40 minutes.

The colored polyesters filaments obtained according to these steps are a reddish-yellow and exhibit great fastness, especially to heat. When the colored polyester is held in the molten state under a nitrogen atmosphere for five hours, there is no noticeable color deterioration.

EXAMPLE 3

One hundred parts of dimethyl terephthalate, 100 parts of ethylene glycol, 5 parts of methanol, and 0.04 parts of cadmium acetate is heated under an inert nitrogen atmosphere. Simultaneously, with this heating process, methanol is continuously distilled off from the transesterification reaction. The theoretical quantity of 46 parts of methanol is obtained at the end of an hour with a terminal reaction temperature of about 220° C. Subsequently, 0.02 parts of tetrabutyl-titanate Ti-(OC$_4$H$_9$)$_4$ and 0.5 parts of dye prepared according to Example 1 are charged in reaction vessel. The mixture is heated for about 30 minutes to about 230°-240° C by a molten metal bath under slightly reduced pressure which eliminates the excess ethylene glycol. Subsequently, the pressure is lowered for about 30 minutes to about 16 mm mercury and the temperature is elevated to about 275° C. Thereafter, the pressure is again lowered to about 0.05 mm mercury and undergoes polycondensation for about 90 minutes.

A golden yellow copolyester is obtained from the process described above with an intrinsic viscosity of about 0.58 100 cm$^3$g$^{-1}$ at 25° C in o-chlorophenol and exhibits a melting point of 254° C determined by thermal differential analysis.

What is claimed is:

1. A dyestuff having the formula

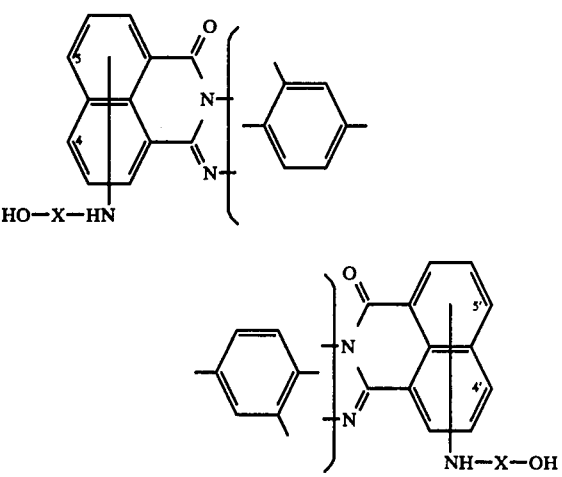

in which X represents a straight or branched aliphatic chain having 1 to 4 carbon atoms, wherein the NH—X—OH residues are fixed in the 4,4' or 4,5' or 5,5' positions.

2. A dyestuff according to claim 1 in which X is a —C$_2$H$_4$— chain.

* * * * *